J. DE ACUÑA.
SYSTEM OF ELASTIC WHEELS FOR ALL CLASSES OF AUTOMOTORS OR TOWED VEHICLES.
APPLICATION FILED NOV. 26, 1918.

1,315,012.

Patented Sept. 2, 1919.
4 SHEETS—SHEET 1.

Inventor
José de Acuña,

WITNESS:—
Chas. L. Griesbauer

By
Attorney

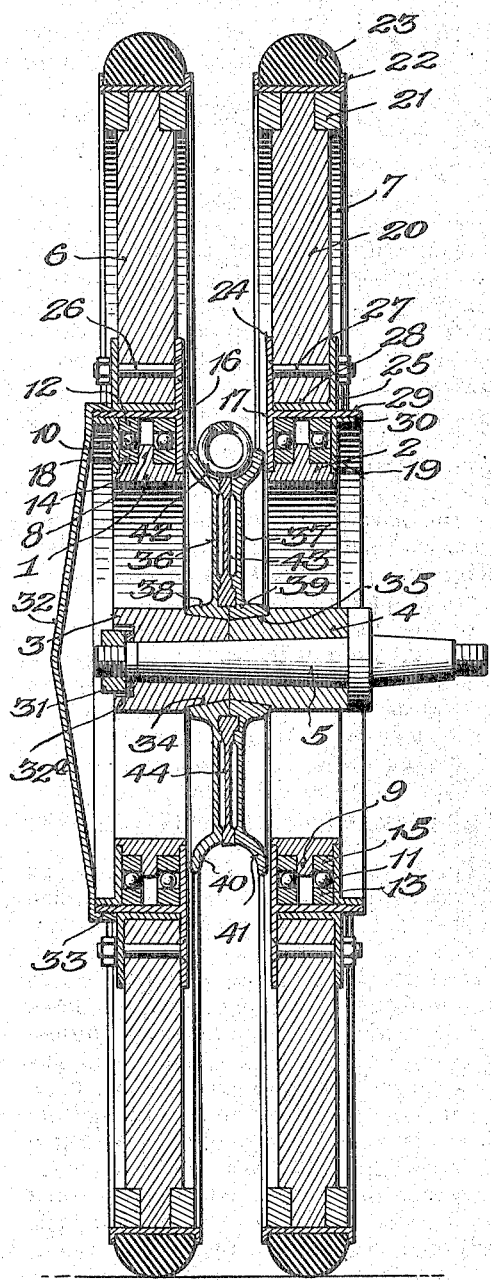
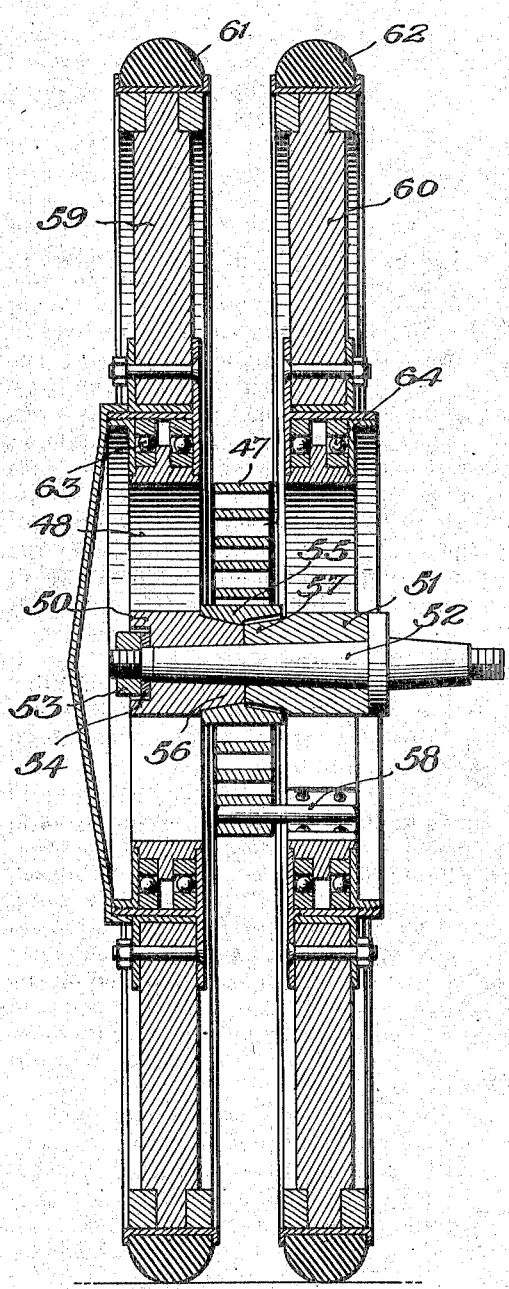

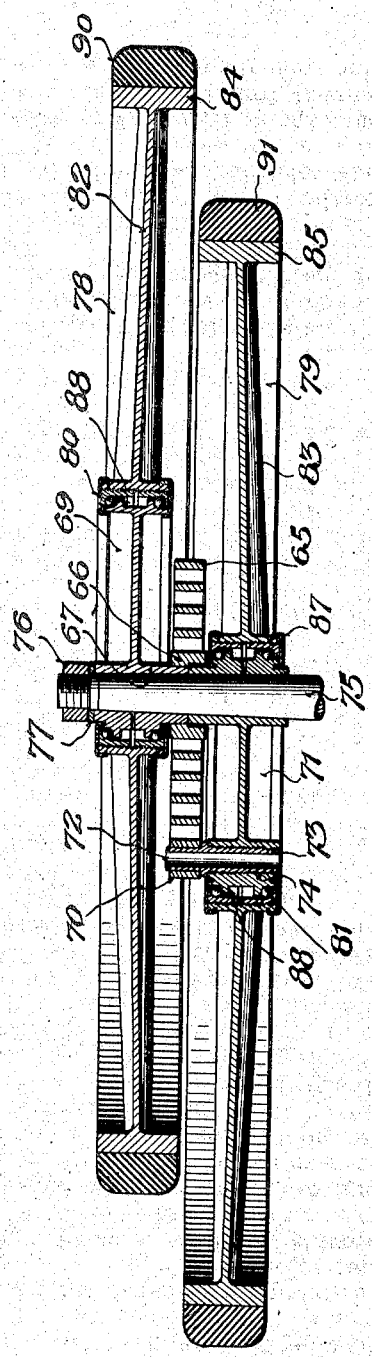

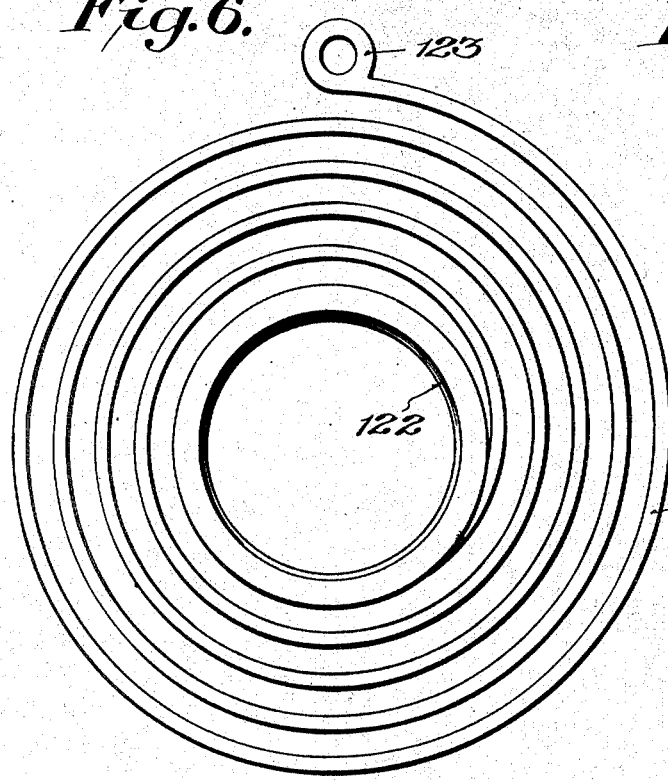
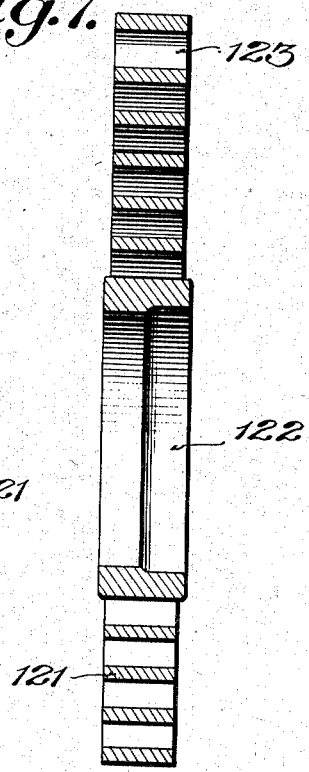
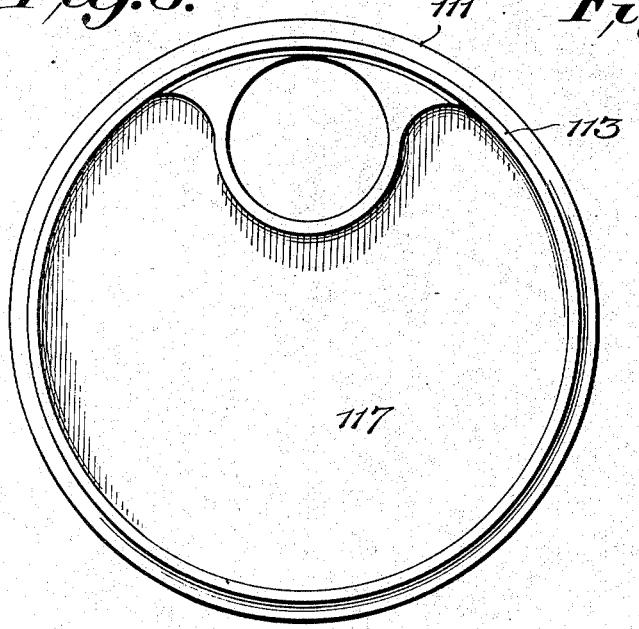
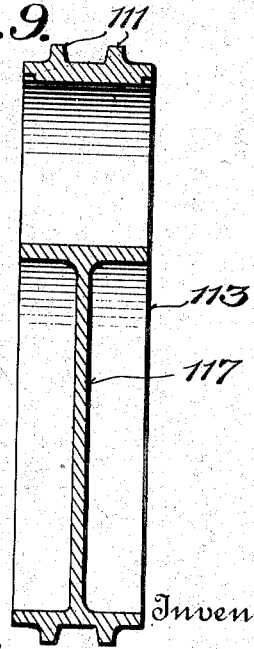

UNITED STATES PATENT OFFICE.

JOSÉ DE ACUÑA, OF MADRID, SPAIN.

SYSTEM OF ELASTIC WHEELS FOR ALL CLASSES OF AUTOMOTORS OR TOWED VEHICLES.

1,315,012.  Specification of Letters Patent.  Patented Sept. 2, 1919.

Application filed November 26, 1918. Serial No. 264,233.

*To all whom it may concern:*

Be it known that JOSÉ DE ACUÑA, civil engineer, a subject of the Kingdom of Spain, residing at No. 23 Claudio Coello, Madrid, Spain, has invented certain new and useful Improvements in New Systems of Elastic Wheels for All Classes of Automotors or Towed Vehicles, of which the following is a specification.

This invention relates to an elastic wheel structure for motor and other vehicles.

The principal object of the present invention is to provide a simple, practical and efficient elastic wheel structure of strong, durable and comparatively inexpensive construction designed for use on various types of vehicles and adapted to be readily applied to the spindles or axles of the steering and driving wheels of motor vehicles and the axles of various other types of vehicles and to the spindles or axles of road trucks, lorries, traction engines, motor-cycles, and analogous machines or devices and capable of dispensing with pneumatic tires and other resilient tires and resilient wheels and of eliminating the troubles, disadvantages and difficulties incident thereof, and of absorbing and dissipating within it the jar and vibrations incident to the travel of vehicles over uneven surfaces and of thereby preventing such jars and vibrations from being transmitted to the axles and the frames or bodies of such vehicles.

With these and other objects in view, the invention consists in the construction and novel combination and arrangement of parts hereinafter fully described, illustrated in the accompanying drawings and pointed out in the claims hereto appended, it being understood that various changes in the form, proportion, size and minor details of constructions, within the scope of the claims, may be resorted to without departing from the spirit or sacrificing any of the advantages of the invention.

In the drawings:—

Fig. 2 is a vertical sectional view of the same.

Fig. 3 is a vertical sectional view of another form of elastic steering wheel structure in which a coil spring of the barrel type is employed.

Fig. 4 is a similar view of an elastic steering wheel structure illustrating a slightly modified form of the invention.

Fig. 5 is a vertical sectional view of an elastic driving wheel structure constructed in accordance with this invention.

Fig. 6 is a detail side elevation of the coiled spring shown in Fig. 5.

Fig. 7 is a sectional view of the spring.

Fig. 8 is a detail side elevation of one of the rings or annular members on which the wheel elements are mounted.

Fig. 9 is a sectional view of the same.

Figures 1, 10:
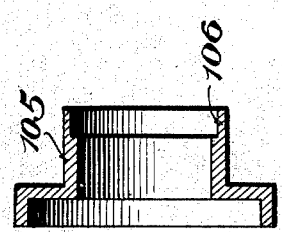
Figure 1 is a side elevation partly in section of an elastic steering wheel structure illustrating a form of the invention employing an arcuate spiral spring adapted to be placed under tension by relative movement of a pair of eccentrically mounted wheels for absorbing the jar and vibration.
Fig. 10 is a detail sectional view of one of the barrels or casings of the inner ball bearings.

Referring particularly to Figs. 1 and 2 of the accompanying drawings, the elastic steering wheel structure comprises in its construction central supporting rings or members 1 and 2 provided within their circumferences with eccentrically arranged bearings 3 and 4 for the reception of a steering spindle 5 equipped with outer ball bearings which are interposed between the central supporting rings or members 1 and 2 and wheel elements 6 and 7 which are adapted to rotate on the central supporting rings or members. The central supporting rings or members are adapted to be mounted on the steering spindle 5 in place of an ordinary vehicle wheel and they may be easily and quickly substituted for such a wheel and may be employed wherever an ordinary wheel of this character is utilized on carriages, wagons, machines and the like. The central supporting rings or members are provided at their peripheries with annular ribs 8 and 9 forming circumferential races for the reception of anti-friction balls 10 and 11 which also coöperate with outer bearing rings 12 and 13 arranged in pairs and spaced apart and carried by the wheel elements 6 and 7. Similar inner ball bearing rings 14 and 15 are also mounted on the central supporting rings or members and receive the balls. The balls and the inner and outer bearing rings constitute antifriction bearings which may be of any desired construction and which are arranged beneath fixed annular flanges 16 and 17 and detachable annular flanges 18 and 19 of the wheel elements. The annular flanges 16, 17, 18 and 19 extend inwardly and embrace the central supporting rings or members and hold the wheel elements against relative lateral movement.

The wheel elements 6 and 7 which are shown consisting of spokes 20, fellies 21, rims 22 and tires 23, may be of any other desired construction, either solid wheel elements or open or spoke construction and the said spokes are confined at their inner ends between side plates 24 and 25 forming housings or casings for the inner ends of the spokes and connected by transverse bolts 26 and 27. The side plates 24 and 25 are provided with interfitting cylindrical portions 28 and 29, the cylindrical portions being extended and interiorly threaded for the reception of the detachable side flanges 18 and 19 which have outer laterally projecting rim portions 30 to screw into the cylindrical portions 29 of the side plates. The detachable flanges are adapted to be readily removed to permit the ball bearings, the wheel elements and the central supporting rings or members to be assembled and disassociated. The treads 23 may be of any desired construction as the wheels do not depend upon the same for resiliency or cushioning action and they may be mounted in rims as shown or be constructed in any other desired manner and of any material. The transverse bolts 26 and 27 pierce the side plates and the spokes and retain the cylindrical portions of the side plates in their interfitting or telescoping relation and firmly clamp the side plates to the spokes.

The eccentric bearings 3 and 4 of the supporting rings or members 1 and 2 are arranged in transverse alinement and are secured on the spindle 5 by means of an axle nut 31, a washer 32ª being preferably interposed between the axle nut and the outer bearing 3 as clearly illustrated in Fig. 2 of the drawing, but any other suitable fastening means may, of course, be employed and the projecting cylindrical portion of the outer wheel elements is also exteriorly threaded to receive a closure cap 32 having an interiorly threaded peripheral flange 33 to secure on the extension of the said cylindrical portion of the outer wheel element. The cap closes the central portion of the outer wheel and causes the same to present a solid appearance at the center and while the eccentrically pivoted annular supporting members or rings are shown open they may of course be of any desired construction to secure the required strength and also to render the same as light as necessary, it being designed in practice that the two wheel elements with their supporting means will be approximately one-half the weight of an ordinary vehicle wheel for which the device is to be substituted so that the elastic wheel structure will be approximately the weight of such wheel and will not add materially to the weight of a vehicle or machine.

The transversely alined inner and outer bearings 3 and 4 are provided with oppositely tapered inner portions 34 and 35 which have mounted on them disks 36 and 37 having interiorly tapered hub portions 38 and 39 to fit the tapered portions of the eccentric bearings and provided with annular rim flanges 40 and 41 which are curved and which form a peripheral channel or groove for the reception of a curved or arcuately arranged spiral spring 42 which is connected and its terminals connected respectively with the disks or plates 36 and 37 by attaching arms or pieces 43 and 44. The arms or pieces 43 and 44 which connect the terminals of the spiral spring with the side disks 36 and 37 enable the said side disks or plates 36 and 37, which are connected to and moved with the supporting rings or members, to place the spiral spring under tension when there is a relative rotary movement of the eccentrically pivoted supporting rings or members due to contact of the wheel elements with inequalities of a road surface. A jar or vibration caused by such contact produces a pivotal movement of the eccentric rings or supporting members which is resisted by the coiled spring and the jar and vibration is absorbed by the coacting eccentrically arranged wheel elements and the connecting spring and is dissipated and prevented from being transmitted to the spindle or axle. The arms or pieces 43 and 44 are radially arranged and are preferably pierced at their outer terminals by the ends 45 of the springs. The ends 45 of the springs are threaded for the reception of nuts 46 but any other suitable means may of course be employed for connecting the terminals of the coiled spring with the annular relatively movable rotary side disks or members. The relative rotary side disks or plates 36 and 37 may be connected with the eccentrically pivoted supporting rings or members in any other desired manner as may be readily understood and any other suitable means may of course be employed for supporting the coiled spring in condition for affording a yieldable connection between the wheel elements adapted to be placed in a tension by the relative pivotal movement of the same for yieldably resisting such movement to absorb the jars and vibrations incident to the travel of the yieldable wheel structure over a road surface.

In Fig. 3 of the drawings is illustrated another form of elastic steering wheel structure in which a coiled barrel spring 47 is arranged between inner and outer eccentrically pivoted supporting rings or members 48 and 49 having eccentric bearings 50 and 51 constructed similar to those heretofore described and mounted on a spindle 52 and retained in place by an axle nut 53 and washer 54. A coiled spring 47 is connected at its outer end with the inner eccentrically pivoted supporting ring or member 49 and at its inner end with the outer supporting ring or member 48 by means of a friction ring 55 having an opposite interior taper to conform to the taper of the adjacent ends 56 and 57 of the eccentric bearings of the supporting rings or members 48 and 49 and mounted on a bearing 50 and arranged in spaced relation with the bearing 51. The eccentrically pivoted inner ring or member 49 is provided with a stud or pivot 58 for connecting the outer end of the coiled spring with it and when there is relative pivotal movement of the supporting rings or members 48 and 49 the tension of the spring will be varied and jars and vibrations to which the wheel elements 59 and 60 are subjected will be absorbed and dissipated by the coiled spring 47. The spring 47 is in the form of a barrel spring and it may be of any size and strength to adapt it to the character of vehicle or machine to which the elastic wheel structure is to be applied.

The wheel elements 59 and 60 are constructed similar to the wheel elements heretofore described and are equipped with tires or treads 61 and 62 and have ball bearings 63 and 64 interposed between them and the supporting rings or members. The operation of the eccentrically pivoted supporting rings or members with their wheel elements is similar to those heretofore described, the essential difference between the two forms of the invention lying in the form of the spring which affords the yieldable connection between the wheel elements.

In Fig. 4 of the drawings is illustrated another form of elastic steering wheel structure employing a coiled spring 65 of barrel form connected at its inner end by a friction ring 66 with an extension 67 of the eccentric bearing 68 of the outer supporting ring or member 69 and connected at its outer end 70 with the inner eccentrically supporting ring or member 71 by a pivot 72 preferably provided with a shank portion 73 threaded into an opening 74 of the said inner eccentrically pivoted supporting ring or member. The eccentrically pivoted supporting rings or members are retained on a spindle or axle 75 by means of an axle nut 76 and washer 77 and the said rings or members are equipped with wheel elements 78 and 79 and have ball bearings 80 and 81 interposed between the wheel elements and the supporting rings or members.

The wheel elements 78 and 79 are provided with solid relatively thin corrugated webs or portions 82 and 83 which connect the outer felly or rim portions 84 and 85. The annular supporting members or rings 69 and 71 are provided with spaced peripheral or circumferential ribs 88 forming ball bearing races and the other wheel elements and the inner supporting rings or members are held against relative lateral movement by side plates 89 which also exclude dust from the ball bearings. Any other suitable anti-friction mounting may of course be provided and the rims or fellies 84 and 85 are equipped with suitable treads 90 and 91. The resilient cushioning and shock absorbing action of the coiled spring 65 is similar to the coiled barrel spring heretofore described.

In Figs. 5 to 10 inclusive is illustrated an elastic driving wheel structure comprising a brake drum 92 and a driving disk or member 93 arranged in spaced relation with the brake drum to provide an intervening space for the reception of inner and outer annular supporting members or rings 94 and 95 and wheel elements 96 and 97 which are mounted on the said supporting rings or members. The brake drum 92 and the drive disk or member 93 have interfitting sleeves 98 and 99, the sleeve 98 of the brake drum being arranged on the axle or spindle 100 and being exteriorly recessed at 101 to receive the sleeve 99 which is retained on the sleeve 98 by a nut 102 having a threaded engagement with the outer end of the sleeve of the brake drum. The sleeve of the brake drum is retained on the spindle or axle by an axle nut 103 but any other suitable fastening means may of course be employed. The eccentrically pivoted supporting rings or members 94 and 95 are provided with eccentrically arranged bearings 104 each provided with a pair of barrels or casings 105 having recessed overlapped ends 106 and provided at their outer ends with annular flanges 107 approximately L-shaped in cross section and receiving anti-friction balls 108 and rings or linings 109 and 110. The barrels or casings form sectional linings for the eccentric bearings of the supporting rings or members and the anti-friction balls are located at opposite sides of the supporting rings or members, as clearly illustrated in Fig. 5 of the drawings.

The supporting rings or members are provided at their peripheries with spaced circumferential ribs 111 forming races for anti-friction balls 112 which are interposed between the supporting rings or members and wheel elements 113 and 114 having bearing rings or linings 115 approximately L-shaped in cross section and preferably threaded into hub portions of the wheel elements and presenting bearing faces to the anti-friction balls. The ball bearings are equipped with side plates or clamps 116 for excluding dust from the interior of the bearings and for retaining lubricant therein.

The wheel elements are composed of an intermediate web or connecting portion 117 and an outer felly or rim portion 118 and an inner hub portion 119 and the said web and connecting portion 117 is relatively thin and corrugated and the said outer felly or rim portion is equipped with a suitable tire or tread 120.

The inner and outer supporting rings or members are yieldably connected by means of a coiled spring 121 of barrel form connected at its inner end by a friction ring 122 with one of the barrels or casings of the outer supporting ring or member and connected at the other end 123 with a pivot 124 having a shank 125 threaded into the inner supporting ring or member.

The coiled spring affords the yielding connection between the supporting rings or members heretofore described and the driving movement of the axle 100 is transmitted to the wheel elements by means of inner and outer links 126 and 127. The inner links 126 are pivoted at their inner ends to studs or pivots 128 and preferably carried by the brake drum and the outer ends of the links 126 are mounted on pivots 129 having threaded shanks 130 which are mounted in threaded openings 131 in the hub portion of the inner wheel element 96. The outer links 127 are connected at their outer ends with pivots 132 of the driving disk or member 93 and their inner ends are mounted on pivots 133 which have threaded shanks 134 arranged in threaded openings 135 of the outer wheel element 97.

The mechanism is designed to work in a lubricant and the outer wheel element carries a circular substantially concavo-convex cap 136 which is secured at its periphery to an annular flange 137 of the wheel element 97. The annular flange 137 is located at an intermediate point between the rim and hub portion of the outer wheel element and the inner wheel element is connected with the brake drum by a flexible sheet or closure member 138 constructed of leather or other suitable material and secured to a flange 139 of the inner wheel element by a retaining ring 140 and to the brake drum by a retaining ring 141. The brake drum is provided with an annular recess 142 to receive the retaining ring and the inner peripheral edge of the flexible closure sheet 138 which is of annular formation.

The elastic wheel structure presents two contact points to the supporting surface and the traction of the device is thereby materially greater than the single contact point of a pneumatic tire and an elongated wheel base is thereby provided which increases with the relative pivotal movement of the eccentrically mounted supporting members.

When one of the wheel elements is subjected to a shock the shock or jar is transformed into a vibration which is absorbed and dissipated by the yieldable connecting means between the supporting members and is not transmitted to the spindle or the vehicle or other frame or body supported by the same. The effect of the shock, upon the wheel structure meeting any obstacle, is double, that is to say, two vibrations are produced instead of one, one occurring a fraction of a second later than the other. This is important, as they occur within the elastic wheel structure, which causes them to meet and mutually neutralize each other.

In practice, the double weight of the wheel structure will be but little in excess of a corresponding single wheel and the increased traction of the wheel structure insures the starting of a machine and stability of the same *en route*, especially at high speeds. Recoil is eliminated and the distance between the bearing points of the wheel elements is dependent upon the condition of weight and speed. The elastic wheel structure insures perfect elasticity and at the same time is strong, simple and economical. It eliminates the tire trouble incident to pneumatic tires and enables a solid wheel of any structure to be employed.

What is claimed is:—

1. An elastic wheel structure including supporting members, independent wheel elements arranged side by side and mounted for rotary movement on the supporting members, means for eccentrically pivoting each of the supporting members on a common spindle for independent pivotal movement, and means for yieldably connecting the said members for cushioning and resisting their independent pivotal movement.

2. An elastic wheel structure including a pair of supporting members, wheel elements arranged side by side and mounted for rotary movement on the supporting members, means for eccentrically pivoting the supporting members on a common pivot for independent pivotal movement, and resilient means for connecting the supporting members for cushioning and yieldably resisting such pivotal movement.

3. An elastic wheel structure including a pair of supporting members, wheel elements arranged side by side and mounted for rotary movement on the supporting members, means for eccentrically pivoting the supporting members on a common pivot for independent pivotal movement, and a spring connected with the said members and arranged to be placed under tension by the relative pivotal movement of the said members.

4. An elastic wheel structure including annular supporting members, wheel elements arranged side by side and mounted for rotary movement on the supporting members, means for eccentrically pivoting the supporting members on a common spindle, and resilient means connecting the said members for cushioning and yieldably resisting relative pivotal movement.

5. An elastic wheel structure including annular supporting members having peripheral bearings, wheel elements mounted for rotary movement on the said bearings, means for eccentrically pivoting the said members on a common spindle, and yieldable means for cushioning and resisting relative pivotal movement of the said members.

6. An elastic wheel structure including supporting members provided with eccentric bearings arranged to receive a common spindle, wheel elements arranged side by side and mounted for rotary movement on the supporting members, and resilient means for connecting the wheel elements to resist and cushion relative pivotal movement of the same.

7. An elastic wheel structure including annular supporting members having eccentric bearings arranged to receive a common spindle, wheel elements mounted for rotary movement on the supporting members and arranged in the planes of the same, and yieldable means for connecting the said members to cushion their relative pivotal movement.

8. An elastic wheel structure including supporting members having bearings arranged to receive a common spindle, wheel elements arranged side by side and mounted for independent rotary movement on the said members, and a spring located between and connected with the said members and adapted to be placed under tension by the relative pivotal movement of the said members.

9. An elastic wheel structure including supporting members having bearings arranged to receive a common spindle, wheel elements arranged side by side and mounted for independent rotary movement on the said members, and a spring arranged between the said members and having its terminals connected with the same, said spring being adapted to be placed under tension by the relative pivotal movement of the members.

10. An elastic wheel structure including supporting members having bearings arranged to receive a common spindle, wheel elements arranged side by side and mounted for independent rotary movement on the said members, and a coiled spring arranged between the said members and connected at its inner ends with the same and arranged to be placed under tenion by the relative pivotal movement of the said members.

11. An elastic wheel structure including supporting members having bearings arranged to receive a common spindle, wheel elements mounted for independent rotary movement on the said members, and a coiled spring located between the said members and provided at its inner end with an annulus connected with one of the said members, said spring having its outer end connected with the other of said members whereby the spring is placed under tension by the relative pivotal movement of the members.

12. An elastic wheel structure including supporting members having inner and outer bearings, the inner bearings being eccentric and adapted to be arranged on a common spindle, wheel elements arranged side by side and mounted on the outer bearings of the supporting members, and yieldable means for connecting the said members to cushion their relative pivotal movement.

13. An elastic wheel structure including supporting members having eccentric bearings arranged to receive a common spindle, said members being also provided with peripheral bearings, wheel elements mounted on the peripheral bearings and the said elements, side plates or flanges located at opposite sides of the wheel element and the supporting members and arranged in overlapping relation with the same for resisting relative lateral movement, and yieldable means for connecting the said members for cushioning relative pivotal movement.

14. An elastic wheel structure including supporting members having eccentric bearings arranged to receive a common spindle, wheel elements mounted on the supporting members, yieldable means for connecting the said members to cushion relative pivotal movement, and an exteriorly arranged cap carried by one of the wheel elements and covering the supporting member thereof.

15. An elastic wheel structure including a sleeve adapted to be arranged on a spindle, supporting members having eccentric bearings receiving the sleeve, yieldable means for connecting the supporting members, wheel elements mounted for rotary movement on the supporting members, and driving means for connecting the sleeve with the wheel elements.

16. An elastic wheel structure including a sleeve adapted to be arranged on a spindle, supporting members having eccentric bearings receiving the sleeve, yieldable means for connecting the supporting members, wheel elements mounted for rotary movement on the supporting members, and driving means having links for connecting the sleeve with the wheel elements.

17. An elastic wheel structure including a sleeve adapted to be arranged on a spindle, supporting members having eccentric bearings receiving the sleeve, yieldable means for connecting the supporting members, wheel elements mounted for rotary movement on the supporting members, and driving means having separate sets of links located at the ends of the sleeve for connecting the same with the wheel elements.

18. An elastic wheel structure including a sleeve adapted to be arranged on a spindle, supporting members having eccentric bearings receiving the sleeve, yieldable means for connecting the supporting members, wheel elements mounted for rotary movement on the supporting members, a brake drum carried by the sleeve at the inner end thereof, a driving plate mounted on the sleeve at the outer end thereof, and means for connecting the brake drum and the driving plate with the wheel elements.

19. An elastic wheel structure including a sleeve adapted to be arranged on a spindle, supporting members having eccentric bearings receiving the sleeve, yieldable means for connecting the supporting members, wheel elements mounted for rotary movement on the supporting members, a brake drum carried by the sleeve at the inner end thereof, a driving plate mounted on the sleeve at the outer end thereof, and inner and outer links connecting the brake drum and the driving plate with the wheel elements.

20. An elastic wheel structure including a sleeve adapted to be arranged on a spindle, supporting members having eccentric bearings receiving the sleeve, yieldable means for connecting the supporting members, wheel elements mounted for rotary movement on the supporting members, a brake drum carried by the sleeve at the inner end thereof, a driving plate mounted on the sleeve at the outer end thereof, means for connecting the brake drum and the driving plate with the wheel elements, and a flexible annular closure member connected with the brake drum and the adjacent wheel element.

21. An elastic wheel structure including a sleeve adapted to be arranged on a spindle, supporting members having eccentric bearings receiving the sleeve, yieldable means for connecting the supporting members, wheel elements mounted for rotary movement on the supporting members, a brake drum carried by the sleeve at the inner end thereof, a driving plate mounted on the sleeve at the outer end thereof, means for connecting the brake drum and the driving plate with the wheel elements, a flexible annular closure member connected with the brake drum and the adjacent wheel element, and a closure cap mounted on the other wheel element and covering the supporting member of the same and the driving means thereof.

In testimony whereof he affixes his signature.

JOSÉ DE ACUÑA.

Witnesses:
J. LÓPEZ,
R. SABRATL.